United States Patent

Lock

[15] 3,676,872

[45] July 11, 1972

[54] PROPAGATION OF MAGNETIC BUBBLE DOMAINS

[72] Inventor: Roger David Lock, Manotick, Ontario, Canada

[73] Assignee: Bell Canada-Northern Electric Research Limited, Ottawa, Ontario, Canada

[22] Filed: June 21, 1971

[21] Appl. No.: 155,043

[52] U.S. Cl...............340/174 TF, 340/174 SR, 340/174 NA

[51] Int. Cl.....................................G11c 11/14, G11c 19/00

[58] Field of Search.................340/174 TF, 174 NA, 174 SR

[56] References Cited

UNITED STATES PATENTS 3,503,054 3/1970 Bobeck et al. ...................340/174 TF

OTHER PUBLICATIONS

IBM Technical Disclosure Bulletin, " Bubble Device Configuration" by Giess et al., Vol. 13, No. 5, 10/70, pp. 1209, 1210.
IBM Technical Disclosure Bulletin, " Composite Cylindrical Magnetic Domain Materials" by Ahn et al., Vol. 13, No. 11, 4/71, p. 3220.

*Primary Examiner*—Stanley M. Urynowicz, Jr.
*Attorney*—S. T. Jelly

[57] ABSTRACT

Propagation of small magnetic bubble domains by larger magnetic bubble domains. Small domains—called bubbles—can be propagated singly or in groups under the control of a larger bubble. Control is easier as conductor patterns can be larger than required for the small bubbles. Also small bubbles of a size which hitherto have proved difficult or impossible to control can be controlled by use of the invention.

14 Claims, 6 Drawing Figures

PROPAGATION OF MAGNETIC BUBBLE DOMAINS

This invention relates to the propagation of magnetic bubble domains and particularly to the propagation of small bubble domains.

Magnetic bubble domains, hereinafter referred to as bubbles, are formed in thin magnetic oxide platelets. Propagation of the bubbles is carried out by means of a magnetic thin film overlay, for example of a material known as permalloy, etched into a predetermined pattern. Such patterns are well known, for example T and I bar patterns. Also various patterns of conductors and combinations of conductors and thin magnetic film patterns have been used. Bubbles are moved, or propagated, along paths defined by the patterns by suitable magnetic fields.

Magnetic film overlays and conductor patterns have certain disadvantages. Typically these include (a) the patterns are fabricated by photolithographic techniques together with deposition of the film either by vacuum deposition, electroplating or electroless plating of the particular metal used. It is desirable that pattern elements should have physical sizes closely related and comparable to the size of the bubbles they are intended to manipulate. With present known techniques it is difficult to produce patterns for some bubbles, for example the larger bubbles obtained in garnets. Further it is impossible at present to produce satisfactory patterns for small bubbles, for example the smaller bubbles obtained in garnets; (b) small defects in the magnetic oxide platelet near the pattern can interfere with bubble propagation and even bring it to a halt.

The present invention provides for the propagation of small bubbles by larger bubbles. The small bubbles may be propagated, under the control of a larger bubble, singly or in groups. Thus blocks of information may be conveyed, and abstracted, the block represented by a group of small bubbles. The larger bubbles are propagated by means of patterns of larger physical sizes, which can be produced or are easier to produce.

In its broadest aspect the invention provides a method for the propagation of bubbles by the use of larger bubbles, the larger bubbles propagated under control of predetermined patterns of magnetic material or conductors. The invention also provides a magnetic bubble domain device comprising a multilayer assembly of magnetic oxide layers, with successively larger magnetic bubbles formed in each layer, and means for propagating the larger bubbles in a predetermined path, propagation of the larger bubbles controlling propagation of the smaller bubbles.

The invention will be readily understood by the following description of certain embodiments, by way of example only, in conjunction with the accompanying diagrammatic drawings, in which.

Figure 1:
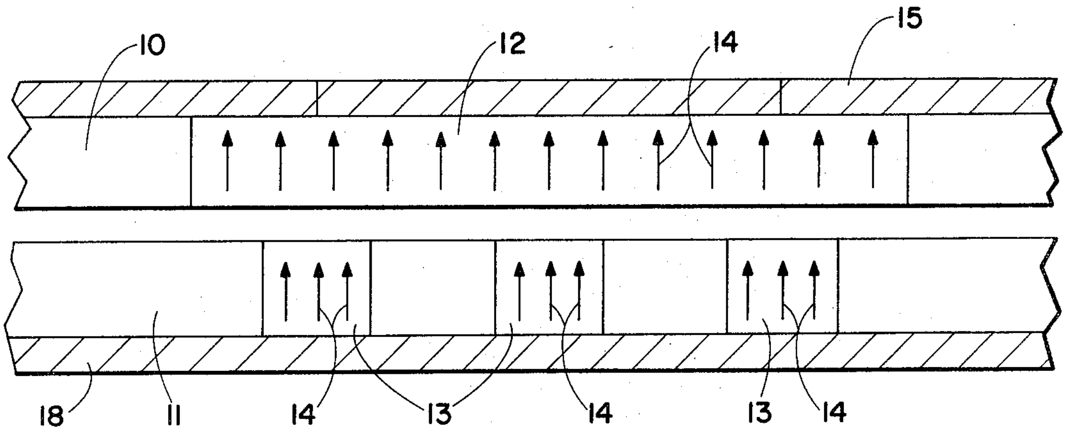
FIG. 1 is a side view of a two layer assembly to a very large scale.
Figure 2:
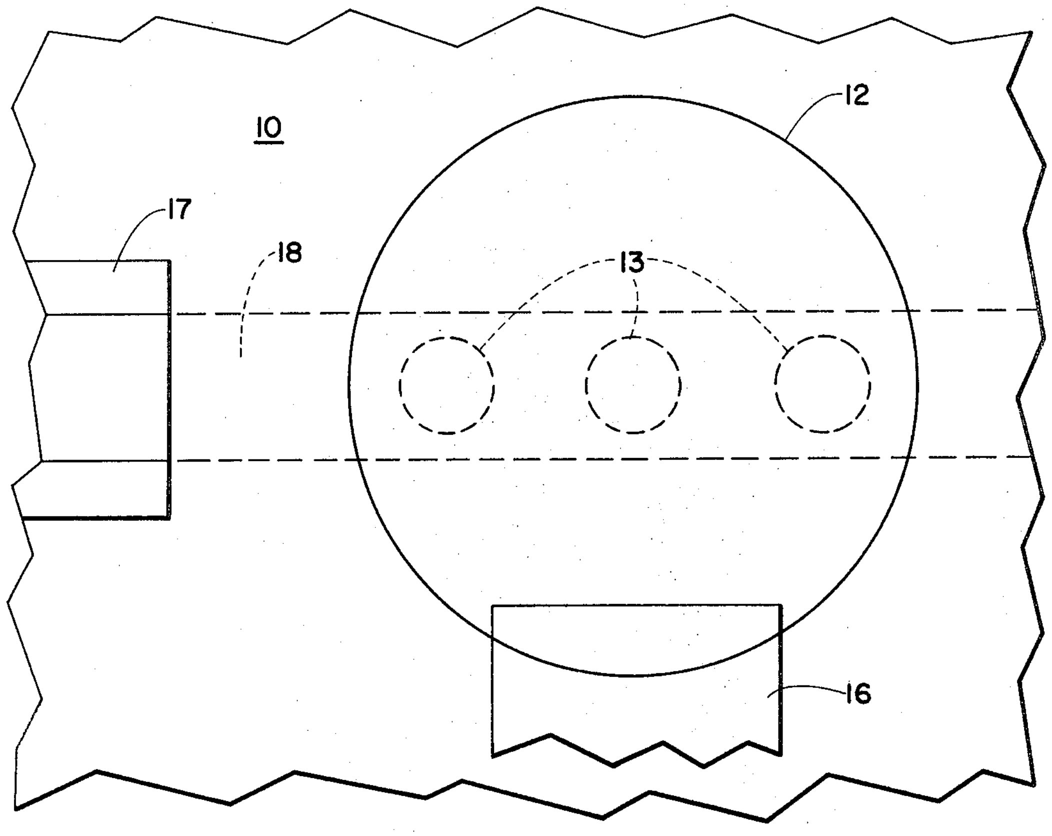
FIG. 2 is a plan view of the arrangement of FIG. 1.

FIGS. 1 and 2 illustrate diagrammatically an embodiment of the present invention, to a greatly increased scale, comprising two platelets 10 and 11 mounted in close parallel relationship. Platelet 10, in the present example, is of $YbFeO_3$ and platelet 11 is of $SmTbFeO_3$. In the platelet 10 is formed a relatively large magnetic bubble domain, or bubble 12 and in platelet 11 are formed three smaller bubbles 13. The small bubbles 13 are positioned within the area of the larger bubble 12 and in effect, are "locked in" with the large bubble by the interacting magnetic fields, indicated diagrammatically at 14 in FIG. 1. The small bubbles 13 also remain spaced apart as a result of the natural repulsion.

Figure 3:
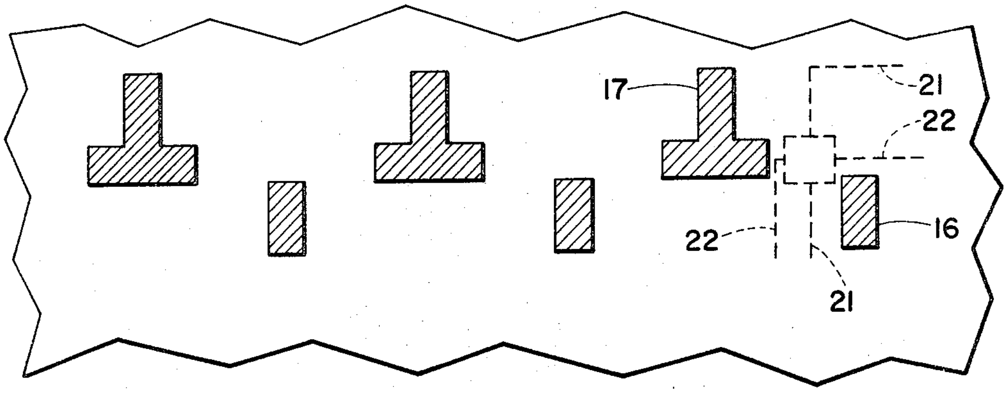
FIG. 3 is a plan view illustrating one form of pattern.

Formed on the outer surface of platelet 10 is a relatively coarse pattern 15 in permalloy. This pattern is, for example, a T and I bar pattern as illustrated in FIG. 3. The bubble 12 is shown positioned at the end of an I bar 16 and one end of a cross bar of a T bar is shown at 17 in FIG. 2. On the outer surface of platelet 11 is formed a guide rail 18 in permalloy. Guide rail 18 acts to maintain the smaller bubbles in alignment under the bubble 12. This arrangement is used when it is desired, or necessary, to maintain the smaller bubbles in a single line. An alternative arrangement omits guide rail 18 and then small bubbles will be formed and positioned over the area of the larger bubble 12. Alternative forms of guide rails can be used. For example a plurality of rails can be provided to maintain a plurality of lines of small bubbles. Alternatively sets of spaced parallel guide lines may be provided, the smaller bubbles maintained between the guide rails.

Bias magnetic fields exist, in the known manner, and the normal rotating field will be provided for propagating the larger bubbles. The platelets 10 and 11 are spaced such that there is no undesired effect on the small bubbles from the magnetic fields acting on the large bubbles, particularly as the field strength decreases as the cube of the distance.

Figures 4, 5:
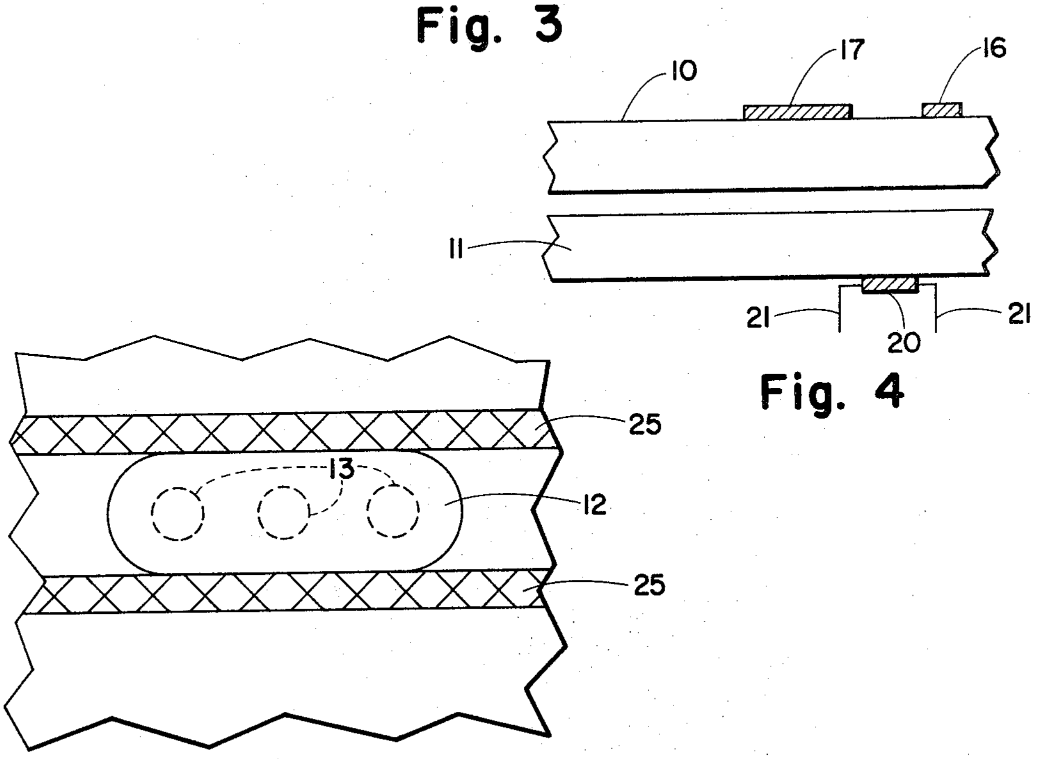
FIG. 4 is a cross-section on the line IV—IV of FIG. 3.
FIG. 5 is a plan view of a modification giving oval, or elongated, large bubbles.

Various known ways of abstracting information represented by the small bubbles exist, and one device known as a Hall device is illustrated in FIGS. 3 and 4. The device comprises a small bar 20 of semiconductor material, mounted on the platelet 11 between a T bar 17 and an I bar 16. The bar 20 has two pairs of opposed electrical leads 21 and 22. With a constant current source applied to one pair of leads, for example leads 21, a voltage output occurs at leads 22 when a bubble passes over the platelet 20.

The large bubbles 12 can also be of a shape other than circular. For example, as illustrated in FIG. 5, by the use of rails 25, of permalloy typically, the large bubble 12 can be caused to assume an elongated shape. Such a shape is particularly useful when a single line of small bubbles is to be propagated.

Figure 6:
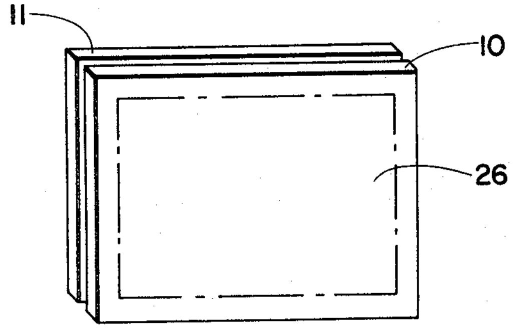
FIG. 6 is a perspective view of a complete magnetic domain device.

FIG. 6 illustrates a device, in accordance with the invention, the platelets 10 and 11 being shown. The pattern controlling the propagation of the large bubbles can extend over the major part of the platelet 10, as indicated by the chain dotted line 26, in a known manner. It may be possible to avoid the provision of patterns on platelet 11, depending upon the use of the device, but even where patterns are needed or desired they only have high resolution areas at the input and output, these being the production and coding area and reception and decoding area respectively.

The invention is particularly applicable for systems having information in packages. Such a package could be a word, or a subsection of a word, in a memory system. With groups of bubbles propagated in accordance with the invention it becomes easier to extend the system to other than a binary as usually employed, if so desired.

It is possible to use more than two platelets, there being provided a multilayer device. For example the central platelet of a three layer assembly could propagate the larger bubbles 12 while the platelets either side propagated small bubbles in groups associated with the larger bubbles. The number of smaller bubbles in the groups could be different in each platelet.

As no pattern at all, or only a relatively coarse pattern, is required for at least the major part of the platelet in which the small bubbles are propagated, the effect of small defects in the platelet on bubble propagation is minimized. Less stringent standards can thus be applied, with an increase in fabrication yield.

The particular arrangement for causing a group of small bubbles to become associated with a larger bubble can vary. For example the larger bubble can be moved in over the smaller bubbles in the same direction as it is intended to move the small bubbles—having the effect somewhat similar to "-sweeping" or "collecting" up a number of bubbles, the small bubbles being held in a predetermined pattern or configuration by a "locking device" such as a permalloy overlay. Alternatively the large bubble can be moved in sideways, over an array or pattern of smaller bubbles in a direction normal to the intended movement the whole then moved in the desired direction.

A considerable variation in the particular arrangement of platelets, propagation patterns, relative size of bubbles and numbers of bubbles can be obtained, the broad concept of the invention being the propagation of small bubbles by larger bubbles, the number of small bubbles per large bubble varying from one upwards.

It is possible to form an assembly of layers by using a material having the same composition for each layer, but with the layers having differing magnetic properties, for example by differences in the processing of the layers. As an example an epitaxial layer of garnet deposited by means of liquid phase epitaxy, then annealed at a particular temperature before the deposition of a second epitaxial layer of the same material with the second layer annealed to a different temperature will provide differences in the magnetic properties in the layers, with the result that bubbles of one size will be formed in one layer and of a different size in the other layer.

What is claimed is:

1. A method of propagating magnetic bubble domains in magnetic oxide layers, comprising: forming at least one domain in a first magnetic oxide layer and forming a domain in a second magnetic oxide layer, the two layers in parallel face-to-face relationship, the domain in the second layer larger than the domain in the first layer;

moving the larger domain into register with the smaller domain; and moving the larger domain in a predetermined path, the smaller domain moving with and under the control of the larger domain.

2. A method as claimed in claim 1, the larger domain moved under the control of a magnetic film, in a predetermined pattern, associated with said second layer.

3. A method as claimed in claim 2, wherein a plurality of small domains are formed in the first layer, a large domain in the second layer controlling a number of smaller domains in the first layer.

4. A method as claimed in claim 1, wherein a plurality of said larger domains are formed in said second layer, and a plurality of said smaller domains are formed in said first layer, each of said larger domains moved in a predetermined path and moving, and controlling the movement of, a plurality of smaller domains.

5. A magnetic bubble domain device comprising two parallel layers of magnetic oxide, the layers of differing composition in face-to-face relationship, a first layer adapted for the formation of magnetic bubble domains which are smaller than magnetic bubble domains formed in the second layer;

means for forming said domains in each of said layers;

means for moving a larger domain into registry with at least one smaller domain; and means for moving the larger domains along a predetermined path.

6. A device as claimed in claim 5, said means for moving the larger domains along a predetermined path including a magnetic film pattern associated with said second layer.

7. A device as claimed in claim 6 said pattern having dimensions compatible with said larger domains and too coarse for said smaller domains.

8. A device as claimed in claim 5, the layer adapted for the formation of the smaller domains having the composition $SmTbFeO_3$.

9. A domain as claimed in claim 8, the layer for the formation of the larger domains having the composition $YbFeO_3$.

10. A domain as claimed in claim 5, the layer adapted for the formation of the smaller domains comprising a garnet.

11. A device as claimed in claim 5 including means at a localized position in the path of the domains for separately controlling the propagation of the smaller domains at said position.

12. A device as claimed in claim 5, including means associated with said first layer for providing additional control of the propagation of the smaller domains.

13. A device as claimed in claim 5 including means for imposing a coding on said smaller domains, at one position in said predetermined path and means for detecting said coding at another position in said predetermined path.

14. A device as claimed in claim 5 comprising at least three layers of magnetic oxide, all the layers in superimposed parallel face-to-face relationship, and adapted for the formation of domains of differing sizes in immediately adjacent pairs of layers.

* * * * *